United States Patent
Hsu et al.

(10) Patent No.: US 10,094,661 B2
(45) Date of Patent: Oct. 9, 2018

(54) OPTICAL SENSOR AND OPTICAL SENSOR SYSTEM

(71) Applicant: PIXART IMAGING INC., Hsin-Chu County (TW)

(72) Inventors: En-Feng Hsu, Hsin-Chu County (TW); Chia-Yu Liu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 504 days.

(21) Appl. No.: 14/718,353

(22) Filed: May 21, 2015

(65) Prior Publication Data

US 2016/0084650 A1 Mar. 24, 2016

(30) Foreign Application Priority Data

Sep. 24, 2014 (TW) .............................. 103133154 A
Jan. 26, 2015 (TW) .............................. 104102611 A

(51) Int. Cl.
*G01C 3/08* (2006.01)
*G01J 1/44* (2006.01)
*G01S 3/78* (2006.01)
*G01S 3/783* (2006.01)

(52) U.S. Cl.
CPC .................. *G01C 3/08* (2013.01); *G01J 1/44* (2013.01); *G01S 3/7803* (2013.01); *G01S 3/783* (2013.01)

(58) Field of Classification Search
None
See application file for complete search history.

(56) References Cited

U.S. PATENT DOCUMENTS

| 5,561,526 A * | 10/1996 | Huber ................ G01B 11/2504 348/E13.005 |
| 7,719,662 B2 * | 5/2010 | Bamji ...................... G01C 3/08 356/3.1 |
| 8,822,894 B2 | 9/2014 | Zheng et al. |
| 9,170,653 B1 * | 10/2015 | Jung ..................... G06F 3/0346 |
| 9,721,343 B2 * | 8/2017 | Huang ...................... G06T 7/74 |
| 2003/0044729 A1 | 3/2003 | Huang et al. |
| 2008/0063294 A1 * | 3/2008 | Burt ................... H04N 5/23212 382/255 |
| 2009/0014658 A1 * | 1/2009 | Cottier ............. H01L 27/14601 250/370.08 |
| 2012/0091372 A1 | 4/2012 | Molnar et al. |
| 2013/0181896 A1 * | 7/2013 | Gruhlke .................. G06F 3/017 345/156 |
| 2013/0335225 A1 * | 12/2013 | Wen ...................... G06F 3/0416 340/573.1 |
| 2014/0177913 A1 | 6/2014 | Holz |
| 2015/0205521 A1 * | 7/2015 | Ding .................... G06F 1/1684 345/175 |
| 2015/0377799 A1 * | 12/2015 | Barak ................ G01N 21/9501 356/512 |
| 2016/0000330 A1 * | 1/2016 | Huang .................. G01J 3/0218 600/476 |
| 2016/0357265 A1 * | 12/2016 | Maani ..................... G06F 3/014 |
| 2017/0168339 A1 * | 6/2017 | Anderson ........... G02F 1/13363 |

FOREIGN PATENT DOCUMENTS

CN 101751187 A 6/2010
CN 103327385 A 9/2013

* cited by examiner

*Primary Examiner* — Charlie Y Peng
(74) *Attorney, Agent, or Firm* — Hauptman Ham, LLP

(57) ABSTRACT

An optical sensor includes at least two optical sensing pixels and at least two different grating elements. These grating elements are disposed above these optical sensing pixels correspondingly.

14 Claims, 6 Drawing Sheets

OPTICAL SENSOR AND OPTICAL SENSOR SYSTEM

RELATED APPLICATIONS

The present application is based on and claims priority to Taiwanese Application Number 103133154, filed Sep. 24, 2014 and Taiwanese Application Number 104102611, filed Jan. 26, 2015, the disclosures of which are hereby incorporated by reference herein in their entirety.

BACKGROUND

1. Field of the Disclosure

This disclosure generally relates to an optical sensor and, more particularly, to an optical sensor and an optical sensor system adaptable to a distance measurement or a gesture recognition.

2. Description of the Related Art

In general, a distance measurement system employs a light source and calculates an object distance according to energy of the light beam of the light source reflected back by the object. Traditionally, it is able to use the triangulation method or time-of-flight (TOF) technique to calculate the distance. However, these methods have a higher cost and a larger system size.

In addition, the development of gesture recognition generally removes background at first by using a 3D image so as to separate the object image. In this technique, two image sensors are used such that the size and cost of a gesture recognition module can not be effectively reduced.

As mentioned above, the present disclosure obtains the 3D image by using the phase detection, and an additional illumination light (used in the TOF mentioned above) is not necessary. In the proposed technique of the present disclosure, a single image sensor is employed so as to implement the distance measurement and gesture recognition.

SUMMARY

Accordingly, the present disclosure provides an optical sensor and an optical sensor system having the advantages of low cost and small size.

The present disclosure provides an optical sensor including at least two optical sensing pixels and at least two different grating elements. The grating elements are disposed above the optical sensing pixels and respectively correspond to the optical sensing pixels.

The present disclosure further provides an optical sensor system including two optical sensing pixels, two grating elements and a processor. The two grating elements have a phase shift from each other and respectively correspond to the two optical sensing pixels. The processor is configured to identify an incident light angle according to intensity signals of the two optical sensing pixels.

The present disclosure further provides an optical sensor including two optical sensing pixels, two grating elements and a processor. The two grating elements have a phase shift from each other and respectively correspond to the two optical sensing pixels. The processor is configured to calculate at least one intensity parameter according to two intensity signals of the two optical sensing pixels.

In one embodiment of the present disclosure, the optical sensor further includes a lens, wherein the grating elements are disposed between the lens and the optical sensing pixels.

In one embodiment of the present disclosure, each of the grating elements is formed by at least two metal layers.

In one embodiment of the present disclosure, the optical sensor further includes a filter element, wherein the grating elements are disposed between the filter element and the optical sensing pixels.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
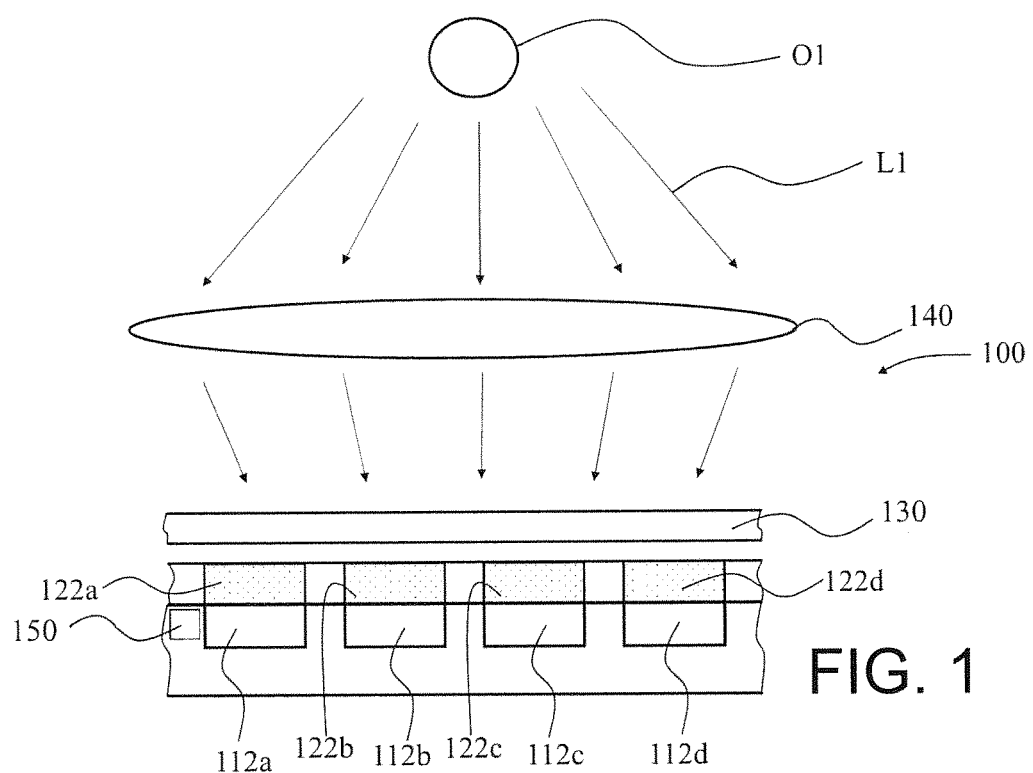
FIG. 1 is a schematic diagram of an optical sensor according to one embodiment of the present disclosure.
Figure 2:
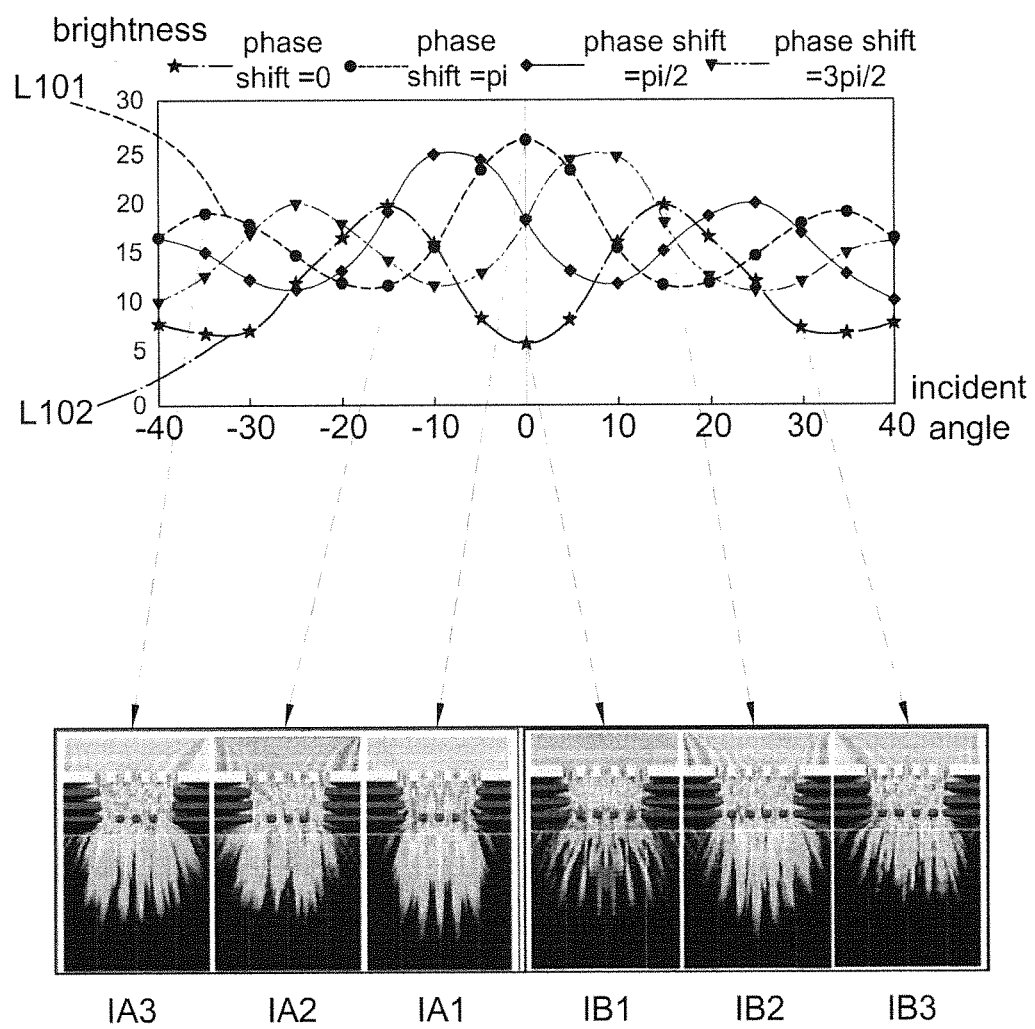
FIG. 2 is a schematic diagram of the intensity variation of light beams in different angles passing through grating elements of different phase shifts.
Figure 3A:
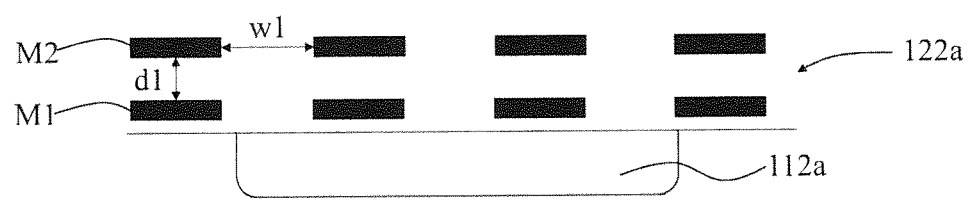
FIGS. 3A to 3D are schematic diagrams of the embodiment of the grating element shown in FIG. 1.
Figure 3B:
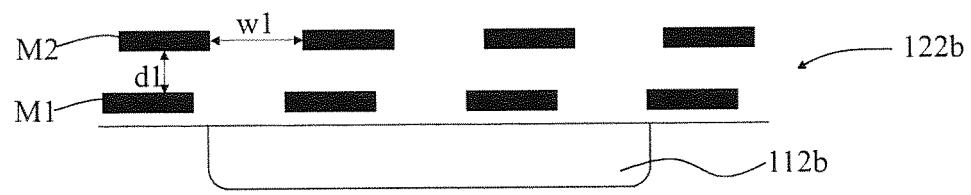
Figure 3C:
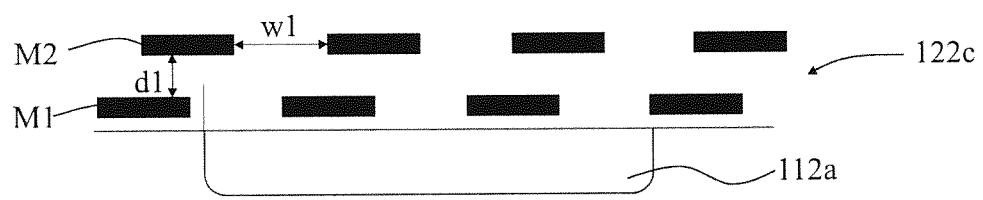
Figure 3D:
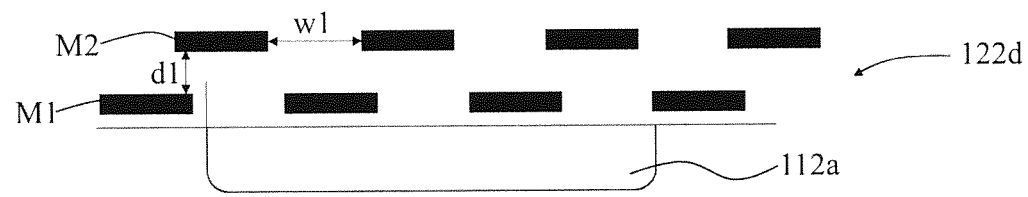

FIG. 1 is a schematic diagram of an optical sensor according to one embodiment of the present disclosure, and FIG. 2 is a schematic diagram of the intensity variation of light beams in different angles passing through grating elements of different phase shifts, wherein said grating elements of different phase shifts are, for example, shown in FIG. 3A to FIG. 3D.

Referring to FIG. 1, the optical sensor 100 of this embodiment includes at least two optical sensing pixels (e.g. four optical sensing pixels 112a, 112b, 112c and 112d shown herein, but not limited thereto), wherein each of the optical sensing pixels 112a, 112b, 112c and 112d respectively corresponds to a grating element 122a, 122b, 122c and 122d thereupon. A phase shift between these grating elements 122a, 122b, 122c and 122d is, for example, 0 degree, 90 degrees, 180 degrees or 270 degrees. That is, the grating elements 122a, 122b, 122c and 122d have a phase shift from each other and respectively correspond to the optical sensing pixels 112a, 112b, 112c and 112d.

In the present disclosure, the optical sensing pixels 112a, 112b, 112c and 112d are pixels manufactured individually, or pixels adjacent or not adjacent to each other in a same pixel array without particular limitations. For example in some embodiments, a part of pixels of a pixel array is selected to be configured as the optical sensing pixels 112a, 112b, 112c and 112d, and other pixels of the pixel array perform other functions.

Specifically speaking, the imaging of incident light beams L1 (or object light beams) of different incident light angles on associated optical sensing pixels has different intensity variations after the incident light beams L1 pass through grating elements having different phase shifts, e.g. four intensity variations corresponding to four grating elements as shown in FIG. 2. In other words, the optical sensor 100 of this embodiment may derive the direction and position of an incident light beam L1 (or object light beam) through the sensed intensity of the optical sensing pixels 112a, 112b, 112c and 112d thereby calculating the position of an object O1. Details are described with an example hereinafter.

Referring to a curve L101 shown in FIG. 2 at first, the curve L101 indicates an intensity variation of incident light beams L1 at different incident light angles (e.g. −40 degrees to +40 degrees shown in FIG. 2) passing through the grating element of 180 degrees phase shift, wherein a normal incident light beam (i.e. incident light angle of 0 degree) has the highest intensity, and the intensity gradually changes with the increase of the incident light angle. Comparatively, a curve L102 indicates an intensity variation of incident light beams L1 at different incident light angles (e.g. −40 degrees to +40 degrees shown in FIG. 2) passing through the grating element of 0 degree phase shift, wherein a normal incident light beam (i.e. incident light angle of 0 degree) has the lowest intensity, and the intensity gradually changes with the increase of the incident light angle. Accordingly, according to intensity signals (i.e. gray level signals) sensed by the optical sensing pixels 112a, 112b, 112c and 112d, it is able to derive an incident light angle of an incident light beam L1. Furthermore, the position and the position variation of an object O1 is obtainable through light tracking. In other words, the optical sensor 100 of this embodiment may derive the position of the object O1 by only employing more than two optical sensing pixels 112a, 112b, 112c and 112d. In addition, compared to the traditional distance measurement system (DMS) which employs light illumination, as the optical sensor 100 of this embodiment detects the position of the object O1 using fewer optical sensing pixels 112a, 112b, 112c and 112d and without the light illumination, it has the advantages of low cost and small size.

In some embodiments, in order to eliminate the influence from the color of an object O1 and from ambient light, the relationship of intensity signals sensed by different optical sensing pixels versus incident light angles when the object O1 is at the same position may be previously constructed as a look-up table, e.g. Table 1 below, to be stored in a memory unit.

TABLE 1

| Intensity parameter 1 | Intensity parameter 2 | Incident light angle | Object height |
|---|---|---|---|
| $I_{A1}/(I_{A1} + I_{B1})$ | $I_{B1}/(I_{A1} + I_{B1})$ | $\Phi_{A1}, \Phi_{B1}$ | $H_1$ |
| $I_{A2}/(I_{A2} + I_{B2})$ | $I_{B2}/(I_{A2} + I_{B2})$ | $\Phi_{A2}, \Phi_{B2}$ | $H_2$ |
| $I_{A3}/(I_{A3} + I_{B3})$ | $I_{B3}/(I_{A3} + I_{B3})$ | $\Phi_{A3}, \Phi_{B3}$ | $H_3$ |

For example in Table 1, $I_{A1}$ indicates the intensity passing the grating element of 180 degrees when the object O1 is at a first position, and $I_{B1}$ indicates the intensity passing the grating element of 0 degree when the object O1 is at the first position; $I_{A2}$ indicates the intensity passing the grating element of 180 degrees when the object O1 is at a second position, and $I_{B2}$ indicates the intensity passing the grating element of 0 degree when the object O1 is at the second position; and $I_{A3}$ indicates the intensity passing the grating element of 180 degrees when the object O1 is at a third position, and $I_{B3}$ indicates the intensity passing the grating element of 0 degree when the object O1 is at the third position, wherein the intensity $I_{A1}$ to $I_{A3}$ and $I_{B1}$ to $I_{B3}$ may be referred to FIG. 2. $\Phi_{A1}$ to $\Phi_{A3}$ indicate incident light angles of the intensity parameter 1 corresponding to the grating element of 180 degrees, and $\Phi_{B1}$ to $\Phi_{B3}$ indicate incident light angles of the intensity parameter 2 corresponding to the grating element of 0 degree. As a transverse distance between different grating elements is obtainable previously, the distance (or height), two-dimensional coordinate and three-dimensional coordinate of the object O1 are obtainable by using the triangulation if the incident light angle is already known. Meanwhile, the gesture recognition may be performed according to the variation with time of the three-dimensional coordinates.

Accordingly, in actual measurement the optical sensor 100 identifies the height and coordinate of the object O1 according to the look-up table. However, the present disclosure is not limited thereto and other algorithms may be used, e.g. defining the intensity parameters 1 and 2 in Table 1 by other equations, as long as the influence from the color of the object O1 and from ambient light is eliminated. For example, the intensity parameters 1 and 2 may be obtained by subtracting an average intensity $(I_{A1}+I_{B1})/2$ respectively from the intensity (e.g. $I_{A1}$ and $I_{B1}$) and then divided by a sum of the intensity $(I_{A1}+I0$. For example, the intensity parameters 1 and 2 may be obtained by directly calculating a ratio between the two intensity (e.g. $I_A$, and $I_{B1}$). Therefore, since the influence from ambient light is removable, the present disclosure is also adaptable to other devices employing a light source.

When the optical sensor 100 includes more than two optical sensing pixels, corresponding to one object distance or object coordinate, one intensity parameter is determined by using a plurality of intensity at the same time, or a plurality of intensity parameters are determined by using every two of the plurality of intensity. Then the object distance or object coordinate is determined according to the at least one intensity parameter.

In this embodiment, the optical sensor 100 further includes a processor 150 electrically coupled to the optical sensing pixels 112a, 112b, 112c and 112d, and the processor 150 is configured to calculate the incident light angle, height and coordinate, and perform the gesture recognition.

In one embodiment, said processor is disposed outside of the optical sensor 100 to form an optical sensor system with the optical sensor 100. That is, the optical sensor 100 outputs raw data (i.e. intensity signals) detected by every optical sensing pixel, and the external processor calculates at least one intensity parameter according to the intensity signals of the optical sensing pixels so as to identify the incident light angle, calculate an object distance and coordinate according to the at least one intensity parameter, and perform the gesture recognition according to an intensity variation of a plurality of intensity parameters, wherein a relationship between the intensity parameters and the incident light angles may be previously formed as a look-up table, as shown in Table 1.

In another embodiment, the optical sensing pixels 112a, 112b, 112c and 112d and the processor 150 are all formed in a base layer. That is, the processor 150 is a processing circuit configured to calculate at least one intensity parameter according to intensity signals of the optical sensing pixels 112a, 112b, 112c and 112d, and the at least one intensity parameter is, for example, outputted to an external host. The grating elements 122a, 122b, 122c and 122d are at least two metal layers formed upon the base layer. In addition, as long as the processor 150 has enough calculation ability, the processor 150 is able to perform the calculation of the external processor mentioned above without particular limitations.

In this embodiment, the optical sensor 100 further includes a filter element 130 configured to block the light out of a specific wavelength range, wherein the grating elements 122a, 122b, 122c and 122d are disposed between the filter element 130 and the optical sensing pixels 112a, 112b, 112c and 112d. The embodiment of FIG. 2 takes a wavelength of 550 nm as an example, but the present disclosure is not limited thereto. More specifically speaking, the wavelength of the filter element 130 is determined according to the diffraction equation in conjunction with device parameters, e.g. the distance d1 between two metal layers (e.g. shown in FIGS. 3A to 3D) and the distance between the grating elements and the optical sensing pixels, so as to obtain a better detection results.

In addition, the optical sensor 100 of this embodiment may derive the position of the object O1 by only employing a few optical sensing pixels 112a, 112b, 112c and 112d. In other words, if the optical sensor 100 of this embodiment employs a pixel array having a large number of optical sensing pixels, e.g. an optical pixel array of 300×300, 600×600 and 900×900, it is able to obtain more information about the object O1 so as to construct a 3D object image.

In addition, it should be mentioned that the grating elements 122a, 122b, 122c and 122d shown in FIG. 1 are only intended to illustrate, and they may be implemented by embodiments shown in FIGS. 3A to 3D. More specifically speaking, referring to FIGS. 3A to 3D, the grating elements 122a, 122b, 122c and 122d above the optical sensing pixels 112a, 112b, 112c and 112d may be formed by at least two metal layers M1 and M2, wherein the grating elements of different phase shifts may be formed by deviating the metal layer M1 from M2, changing the distance w1 between metal layers M1/M2 and M1/M2 or changing the distance d1 between metal layers M1 and M2 so as to form the phase shift of 0 degree, 90 degrees, 180 degrees and 270 degrees, wherein values of the distances w1 and d1 may be determined by the diffraction equation according to the target spectrum. In addition, the metal layers M1 and M2 of the grating elements 122a, 122b, 122c and 122d may be any two layers selected from the first to the tenth metal layers in the CMOS process. It should be mentioned that, in the present disclosure M1 and M2 are only intended to indicate different metal layers but not to limit to the first and second metal layers. More specifically, the grating elements in the present disclosure may be manufactured by at least two metal layers of the CMOS process without particular limitations. In some embodiments, each of the optical sensing pixels may correspond to more than one grating elements and is not limited to that shown in FIG. 1.

Figure 4A:
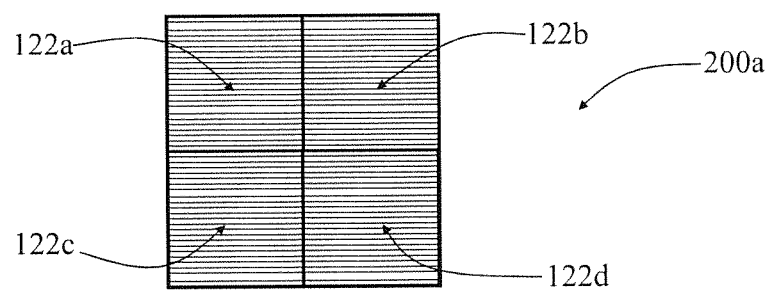
FIGS. 4A to 4C are upper views of the grating element employed in different optical sensors.
Figure 4B:
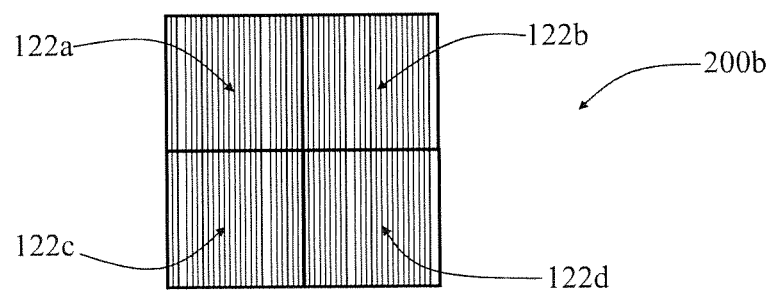
Figure 4C:
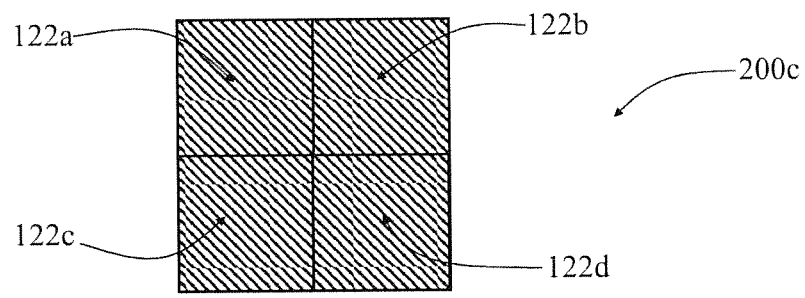

In addition, the arrangement of metal layers of the grating elements 122a, 122b, 122c and 122d above the optical sensing pixels 112a, 112b, 112c and 112d may be shown by optical sensors 200a to 200c as different embodiments in FIGS. 4A to 4C, e.g. arranged in a parallel (transverse) direction, arranged in a vertical (longitudinal) direction, arranged with an inclined angle or a combination thereof, according to different applications.

In some embodiments, the optical sensor 100 further includes at least one lens configured to improve the sensing efficiency. In one embodiment, a lens 140 is disposed above the grating elements 122a, 122b, 122c and 122d such that the grating elements 122a, 122b, 122c and 122d are between the lens 140 and the optical sensing pixels 112a, 112b, 112c and 112d, wherein a predetermined distance between the lens 140 and the grating elements 122a, 122b, 122c and 122d is maintained by using a spacer. In another embodiment, a plurality of microlens may be arranged to respectively opposite to the grating elements 122a, 122b, 122c and 122d, and a passivation layer is formed between the plurality of microlens and the grating elements 122a, 122b, 122c and 122d.

It should be mentioned that values, e.g. the light intensity and phases, in the above embodiments are only intended to illustrate but not to limit the present disclosure.

As mentioned above, the conventional distance measurement system and gesture recognition system have a higher cost and larger size, and generally have to provide an additional light source. Therefore, the present disclosure provides an optical sensor (FIG. 1) and an optical sensor system that may identify the two-dimensional position, the three-dimensional position and the position variation based on that the diffraction light intensity passing through a grating element changes with the incident light angle. And since a light source is not necessary, the present disclosure has the advantages of low cost and small size.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical sensor system, comprising:
    two optical sensing pixels;
    two grating elements having a phase shift from each other and respectively above the two optical sensing pixels, wherein the two grating elements are respectively formed by two metal layers one over the other, and said two metal layers are arranged with an inclined angle with respect to the two optical sensing pixels; and
    a processor configured to
        identify an incident light angle according to intensity signals of the two optical sensing pixels,
        calculate, using a predetermined algorithm, at least one intensity parameter according to two intensity signals of the two optical sensing pixels, and
        perform gesture recognition according to an intensity variation of a plurality of intensity parameters of the at least one intensity parameter varied with time.

2. The optical sensor system as claimed in claim 1, further comprising at least one filter element above the two grating elements.

3. The optical sensor system as claimed in claim 1, further comprising at least one lens aligned with the two grating elements.

4. The optical sensor system as claimed in claim 1, wherein the two metal layers are manufactured by a CMOS process.

5. The optical sensor system as claimed in claim 1, wherein a relationship between the at least one intensity parameter and the incident light angle is previously formed as a look up table.

6. The optical sensor system as claimed in claim 1, wherein the processor is further configured to calculate an object distance according to the at least one intensity parameter.

7. The optical sensor system as claimed in claim 1, wherein said two metal layers are arranged with the inclined angle with respect to edges of the two optical sensing pixels.

8. An optical sensor, comprising:
    two optical sensing pixels;
    two grating elements having a phase shift from each other and respectively above the two optical sensing pixels, wherein the two grating elements are respectively formed by at least two metal layers, and said at least two metal layers are arranged with an inclined angle with respect to the two optical sensing pixels; and
    a processor configured to
        calculate, using a predetermined algorithm, at least one intensity parameter according to two intensity signals of the two optical sensing pixels, and perform gesture recognition according to an intensity variation of a plurality of intensity parameters of the at least one intensity parameter varied with time.

9. The optical sensor as claimed in claim 8, further comprising a filter element above the two grating elements.

10. The optical sensor as claimed in claim 8, further comprising at least one lens aligned with the two grating elements.

11. The optical sensor as claimed in claim 8, wherein two optical sensing pixels and the processor are formed in a base layer.

12. The optical sensor as claimed in claim 11, wherein the at least two metal layers are formed above the base layer.

13. The optical sensor as claimed in claim 12, wherein the at least two metal layers are formed by a CMOS process.

14. An optical sensor system, comprising:
   at least two optical sensing pixels arranged in an array;
   at least two grating elements having a phase shift from each other and respectively above the at least two optical sensing pixels, wherein the at least two grating elements are respectively formed by two metal layers one over the other, and said two metal layers have metal lines extending in a direction different from a column direction and a row direction of the array of the at least two optical sensing pixels; and
   a processor configured to
      identify an incident light angle according to intensity signals of the at least two optical sensing pixels,
      calculate, using a predetermined algorithm, at least one intensity parameter according to intensity signals of the at least two optical sensing pixels, and
      perform gesture recognition according to an intensity variation of a plurality of intensity parameters of the at least one intensity parameter varied with time.

\* \* \* \* \*